United States Patent [19]

Sakurai et al.

[11] 4,378,087
[45] Mar. 29, 1983

[54] APPARATUS FOR AND A METHOD OF AIR CONDITIONING VEHICLES BY CONTROLLING CIRCULATION OF INSIDE AIR AND INTRODUCTION OF OUTSIDE AIR

[75] Inventors: Masao Sakurai, Anjo; Yozo Inoue, Chiryu, both of Japan

[73] Assignee: Nippondenso Co., Ltd., Kariya, Japan

[21] Appl. No.: 186,269

[22] Filed: Sep. 11, 1980

[30] Foreign Application Priority Data

Sep. 12, 1979 [JP] Japan .................. 54-117506

[51] Int. Cl.³ ............................................. B60H 3/00
[52] U.S. Cl. ...................................... 236/13; 236/38; 236/49; 237/2 A; 165/42
[58] Field of Search ............... 237/12.1, 12.3 A, 2 A; 236/49, 13, 12 R, 38; 165/16, 25, 42, 41

[56] References Cited

U.S. PATENT DOCUMENTS

| 3,112,791 | 12/1963 | Brahm | 165/42 |
| 3,315,730 | 4/1967 | Weaver et al. | |
| 3,656,541 | 4/1972 | Coyle et al. | 165/42 |
| 3,667,245 | 6/1972 | Til et al. | 165/42 |
| 3,983,930 | 10/1976 | Franz | 165/42 |
| 4,037,651 | 7/1977 | Ito et al. | 165/42 |
| 4,272,015 | 6/1981 | Houser | 236/49 |

FOREIGN PATENT DOCUMENTS

| 7775 | 6/1980 | European Pat. Off. | 236/13 |
| 2939954 | 4/1980 | Fed. Rep. of Germany | 165/42 |
| 2941305 | 4/1980 | Fed. Rep. of Germany | 165/42 |
| 7703007 | 9/1978 | France | 165/42 |
| 2387135 | 11/1978 | France | 165/42 |
| 1286811 | 8/1972 | United Kingdom | 165/42 |

Primary Examiner—Albert J. Makay
Assistant Examiner—Henry Bennett
Attorney, Agent, or Firm—Cushman, Darby & Cushman

[57] ABSTRACT

An apparatus for controlling the air conditioning of a vehicle in accordance with the operational condition of said vehicle, the state of air conditioning of the passenger compartment of said vehicle and the relationships among the passenger compartment temperature, the atmospheric temperature and a command value of the passenger compartment temperature.

17 Claims, 3 Drawing Figures

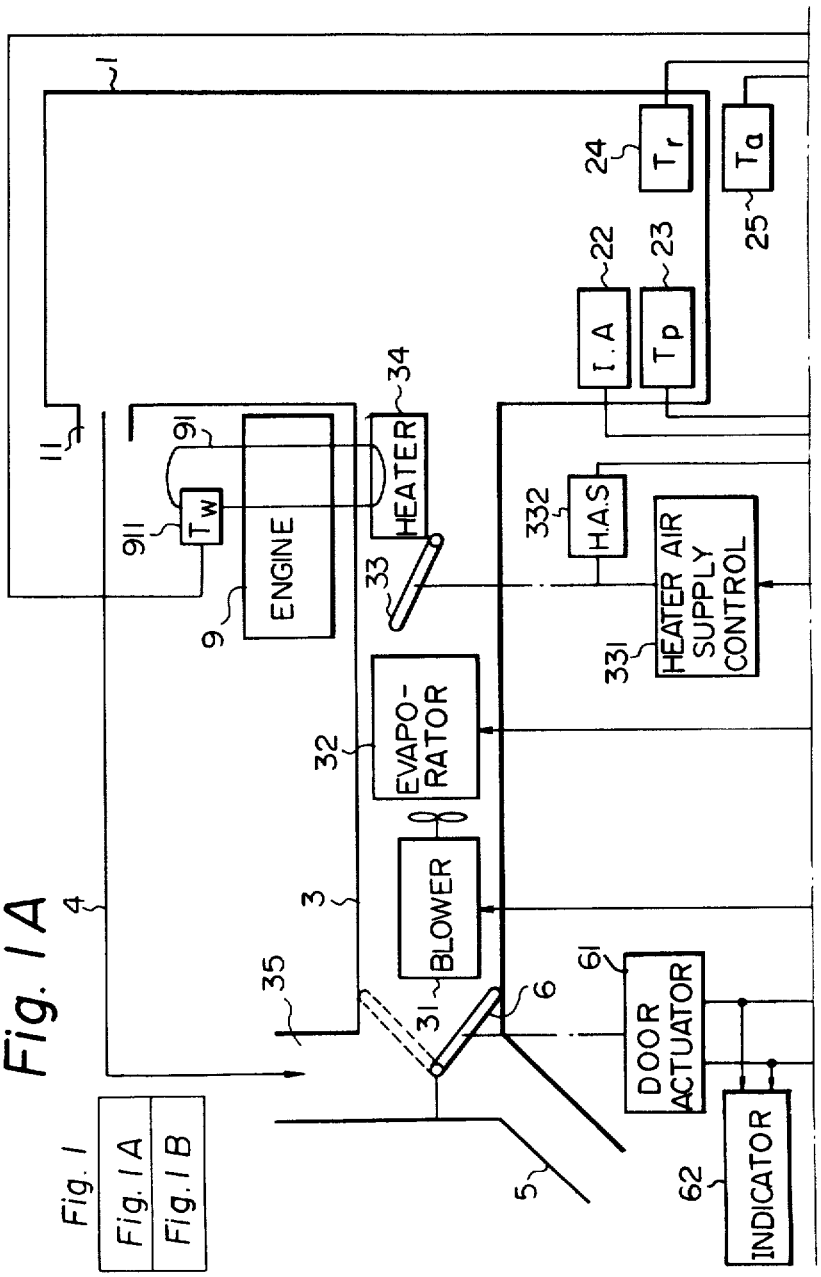

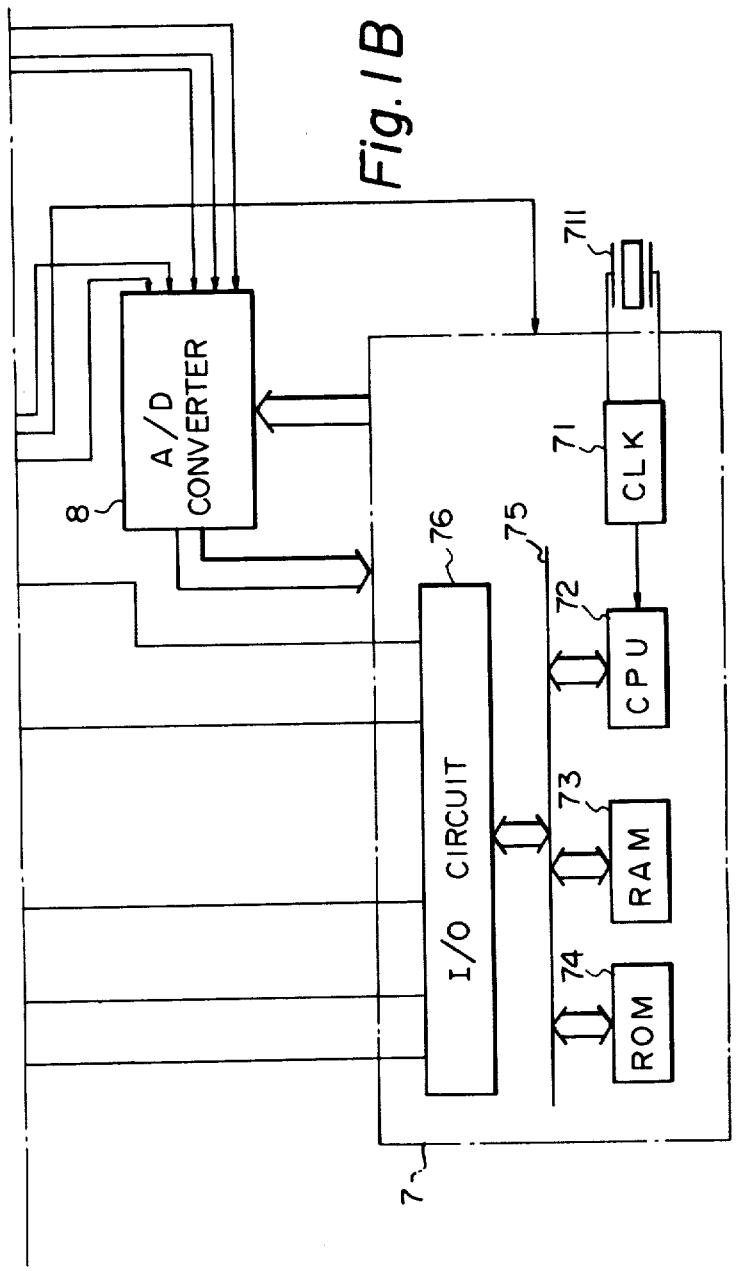

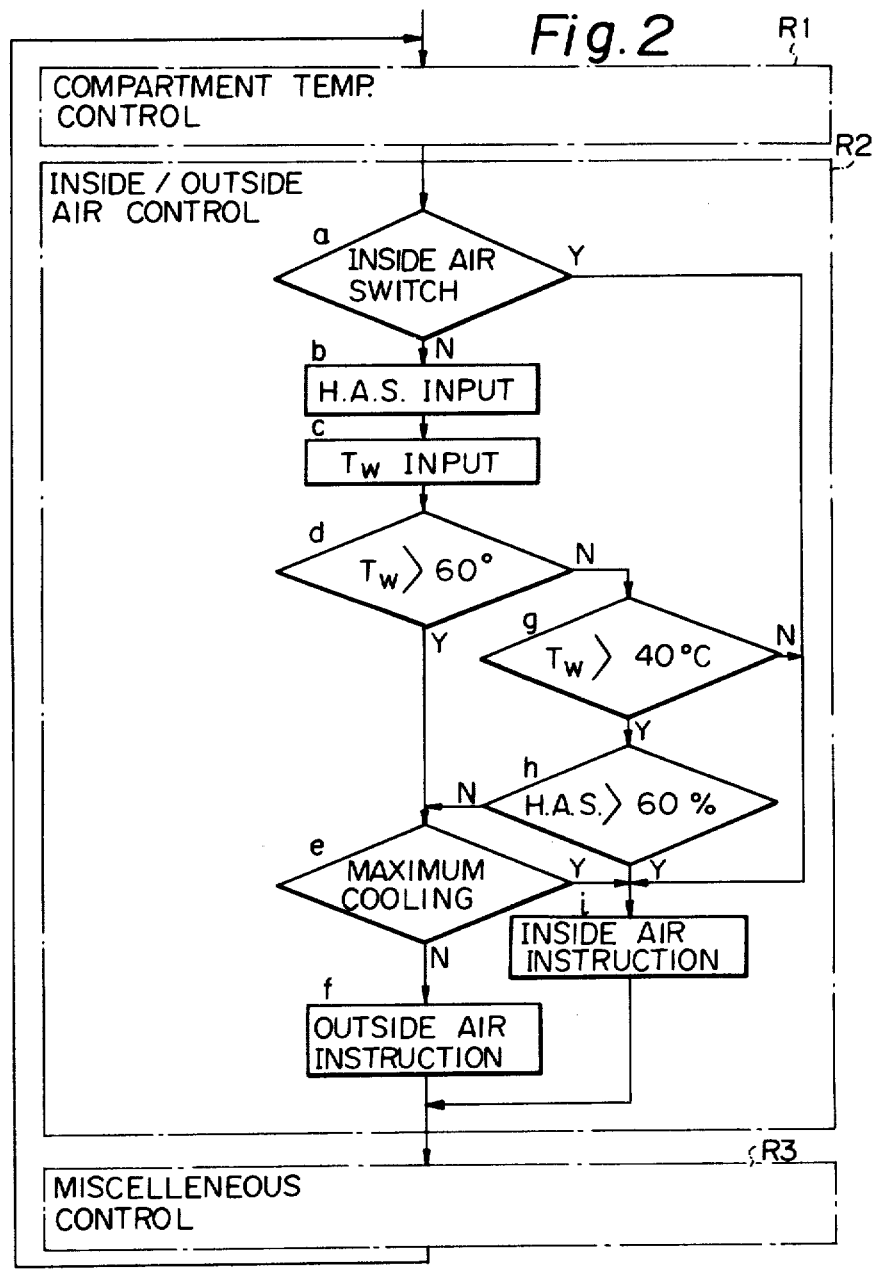

4,378,087

APPARATUS FOR AND A METHOD OF AIR CONDITIONING VEHICLES BY CONTROLLING CIRCULATION OF INSIDE AIR AND INTRODUCTION OF OUTSIDE AIR

TECHNICAL FIELD

The present invention relates to an appratus for and a method of air conditioning vehicles with passenger compartments, such as automobiles, by controlling the circulation of inside-air and the introduction of outside-air.

BACKGROUND ART

A method of controlling an automobile air conditioner has been known in which heating or cooling of air is controlled by an air conditioner and a switch door in the path of the air is switched between a position enabling the circulation of inside-air and a position enabling the introduction of outside-air (See U.S. Pat. No. 3,315,730). However, in such a prior art method, only a limited number of variables are detected to determine the swtiching between the circulation of inside-air and the introduction of outside-air. Accordingly, such a prior art method cannot comply with the requirement that the air conditioning for a vehicle should be controlled by taking into account various factors associated with the operational condition of the vehicle, including the engine warm-up operation of the vehicle, the state of the air conditioning of the passenger compartment of the vehicle and the temperature at any time of the year.

DISCLOSURE OF THE INVENTION

It is the main object of the present invention to provide an apparatus for and a method of air conditioning vehicles by controlling the circulation of inside-air and the introduction of outside-air in which the air conditioning for a vehicle is effected in an optimal manner in accordance with the operational condition of said vehicle, including the engine warm-up operation of the vehicle, the state of the air conditioning of the passenger compartment of said vehicle and the relationships among the passenger compartment temperature, the atmospheric temperature and a command value of the passenger compartment temperature.

According to the present invention, an apparatus of inside-air and introductions of outside-air is provided in which an inlet for inside-air and an inlet for outside-air are selectively opened and closed, and the circulation of inside-air and the introduction of outside-air are selectively effected, said apparatus being characterized by comprising: a sensor for sensing the temperature of the coolant water which circulates through the engine of said vehicle; a detector for detecting the degree of the heater air supply, said heater being used for heating the air supplied to the passenger compartment of said vehicle, and; control means for effecting switching between the inside-air circulation and the outisde-air introduction in accordance with the sensed temperature of the coolant water and the detected degree of the heater air supply.

According to the present invention, a method for air conditioning vehicles by controlling the circulation of inside-air and introduction of outside-air is also provided in which the inlet for inside-air and an inlet for outside-air are selectively opened and closed, and the circulation of inside-air and the introduction of outside-air are selectively effected, characterized in that in said method the inside-air circulation instruction is produced as a result of a determination that the temperature of the coolant water for cooling the engine of said vehicle is lower than a predetermined temperature and the air conditioning is in the state in which the passenger compartment of said vehicle is supplied with the heated air.

BRIEF DESCRIPTION OF THE DRAWINGS

FIGS. 1A and 1B illustrate an apparatus for air conditioning an automobile in accordance with an embodiment of the present invention, and;

FIG. 2 illustrates a computation flow chart of a control procedure for the system of FIGS. 1A and 1B.

DESCRIPTION OF THE PREFERRED EMBODIMENTS

An apparatus for air conditioning vehicles in accordance with an embodiment of the present invention is illustrated in FIGS. 1A and 1B. A duct 3 is connected to a passenger compartment 1, and a switch door 6, a blower 31, an evaporator 32, an air blend door 33 and a heater 34 are provided in the duct 3. When the switch door 6 is in its uppermost position, outdoor air is introduced into the passenger compartment 1 through an inlet 5 and the duct 3 and is exhausted through an outlet 11. When the switch door 6 is in its lowermost position, the inside air is circulated from the passenger compartment 1 through an inside air channel 4 and the duct 3 and back to the passenger compartment 1. The blending of the air cooled by the evaporator 32 and the air heated by the heater 34 is controlled by the angle of the air blend door 33. Heat energy of the heater 34 is supplied from the heated coolant 91 which circulates through the engine 9 of the vehicle.

An inside air circulation command switch 22, a manual temperature command device 23 and a passenger compartment tempterature sensor 24 are arranged in the passenger compartment 1. A water temperature sensor 911 is arranged in the path of the coolant 91. An atmospheric temperature sensor 25 is provided outside the passenger compartment 1. The passenger compartment temperature, the atmospheric temperature, the coolant water temperature and the temperature command value are denoted as $T_r$, $T_a$, $T_w$ and $T_p$, respectively. The position of the switch door 6 is controlled by a door actuator 61. The angle of the air blend door 33 is controlled by heater air supply controller 331 and sensed by a sensor 332 for sensing the degree of the heater air supply (H.A.S.).

A computer circuit 7 and an analog-to-digital converter 8 are provided to control the air conditioning system of FIGS. 1A and 1B. The computer circuit 7 comprises a clock circuit 71, a central processing unit 72, a random access memory 73, a read only memory 74, a bus 75 and an input/output (I/O) circuit 76. The computer circuit 7 is powered by a voltage (e.g. 5 volt) stabilized power source (not shown in FIG. 1B) which is powered by a storage battery provided in the vehicle. The read only memory 74 stores control programs defining calculation procedures in steps of control. The central processing unit 72 effects the calculation using the control programs which are read out step by step from the read only memory 74. The output signals of the I/O circuit 76 are supplied to the door actuator 61, an indicator 62, the blower 31 and the heater air supply controller 331. The clock circuit 71 receives the output of a crystal oscillator 711. The analog-to-digital converter 8 is connected with the computer circuit 7. The output of the inside air circulation command switch 22 is supplied to the computer circuit 7. The outputs of the manual temperature command device 23, the passenger compartment temperature sensor 24, the outside air temperature sensor 25 and the heater air supply (H.A.S.) sensor 332 are supplied to the analog-to-digital converter 8.

Due to the computation effected in the computer circuit 7, the status of an initial period of air conditioning is detected and four temperature, i.e. an outside air temperature, an inside air temperature, a coolant water temperature and a command temperature are detected. As a result of the computation in the computer circuit 7, control signals produced by the I/O circuit 76 of the computer circuit 7 are supplied to the door actuator 61, the blower 31 and the heater air supply controller 331 to effect the selection between the circulation of inside air and the introduction of outside air.

The control procedure for controlling the door actuator 61 will now be described with reference to a computation flow chart of FIG. 2.

The computer circuit 7 is powered by a stabilized voltage from a stabilized power source and carries out computations of a control program with a operation cycle of hundreds of milli seconds, while a vehicle on which the control device is installed operates.

Passenger compartment temperature control to make the passenger compartment temperature equal to the command value preset by the manual temperature command device 23 is carried out in the compartment temperature control routine R1. In the routine R1, a computation using the signal from the compartment temperature sensor 24, the signal from the manual temperature command device 23, the signal from the outside air temperature sensor 25 and the signal from the heater air supply sensor 332 is carried out to obtain a control signal for the heater air supply controller 331. Thus the angle of the air blend door 33 is controlled so that the compartment temperature is caused to be equal to the command temperature preset by the manual temperature command device 23. It is presumed that a 0% state of the heater air supply is the maximum cooling state in which the air flow through the heater 34 is zero, while a 100% state of the heater air supply is the heating state in which the air flow through the heater 34 is maximum.

The switch door control to switch between the circulation of inside air and the introduction of outside air is carried out in the inside/outside air control routine R2. In the routine R2, a computation using the signal from the heater air supply sensor 332, the signal from the water temperature sensor 911 and the signal from the inside air circulation command switch 22 is carried out to obtain a control signal for the door actuator 61. The state of the door 6 is indicated by the indicator 62.

The control of the speed of the blower 31 and the compressor used in the evaporator 32 is carried out in the miscellaneous control routine R3. Then, the computation flow proceeds again to the start of the routine R1 and the rotines R1, R2 and R3 are carried out again so that the cycle consisting of the routines R1, R2 and R3 is repeated with a predetermined cycle time.

The procedure in the inside/outside air control routine R2 will now be explained in detail. The processes 1 through 6 of the control of air conditioning carried out in the apparatus in the apparatus of FIGS. 1A and 1B are as follows.

[Process 1]

In the routine R2, the procedure proceeds from the step a for determing the state of the inside air switch 22, through the step b for receiving the signal (H.A.S.) from the heater air supply sensor the step C for receiving the signal from the water temperature sensor 911, the step d for determining as to whether the water temperature is higher than 60° C. and the step g for determining as to whether the water temperature is higher than 40° C., to the step i for producting the inside air instruction. This is because the water temperature is lower than 40° C. in the period just after the start of operation of the vehicle. The door actuator 61 is supplied with the signal due to the inside-air instruction of the step g so that the door 6 occupies the position as illustrated by a solid line in FIG. 1A. Then, the computation flow from the step a through the steps b, c, d, and g to the step i is repeated to maintain the inside-air circulation. Thus, an efficient air conditioning is carried out for the period immediately after the start of the operation.

[Process 2]

The procedure after the temperature Tw of the coolant reaches 40° will now be explained. When the temperature Tw of the coolant reaches 40°, the determination in the step g is changed to Y (yes), so that the computation flow proceeds to the step h. In the step h the judgement as to whether the percentage of the heater air supply due to the angle of the air blend door 33 is greater than 60% is carried out. If the atmospheric temperature is low, for example, in the morning, the degree of the heater air supply due to the angle of the air blend door is caused to exceed 60%. Then the determination in the step h becomes Y (yes), and accordingly, the inside-air instruction is produced in the step i. The above described computation flow from the step a through the steps b, c, d, g and h to the step i is repeated to maintain the state of inside-air circulation. Thus, an efficient air conditioning continues to be carried out.

[Process 3]

After a predetermined length of time of the operation, the temperature Tw of the coolant water reaches 60° C. When the temperature Tw of the coolant water becomes higher than 60° C., the determination in the step d is changed to Y (yes). Then, the computation flow proceeds to a step e where the determination is carried out as to whether the degree of the heater air supply due to the angle of the air blend door is zero. When this determination is N (no), the computation flow proceeds to a step f where the outside-air instruction is produced so that the door 6 occupies the position as illustrated by a broken line in FIG. 1A. Then, the computation flow from the step a through the steps b, c, d and e to the step f is repeated to maintain the outside-air introduction.

[Process 4]

Under the above described outside-air introduction condition, when the degree of the heater air supply due to the angle of the air blend door becomes zero in accordance with the rise of the atmospheric temperature, the maximum cooling state is attained. Then, the determination in the step e changes to Y (yes) and the computation flow proceeds to the step i where the inside-air circulation instruction is produced. Thus, the inside-air circulation is carried out in order to prevent the deterioration of the cooling because of the introduction of the outside air of high temperature. After that, if the degree of the heater air supply is increased, the determination in the step e again becomes N (no), and accordingly, an outside-air instruction is produced in the step f so that the outside-air introduction is again carried out.

[Process 5]

The process under the condition where the atmospheric temperature is high, for example in the summer will now be explained. The computation flow from the step a, through the steps b, c, d and g to the step i is repeated, so that the inside-air circulation is maintained. When the temperature Tw of the coolant water reaches 40° C., the determination in the step g changes to Y (yes), and accordingly, the computation flow proceeds through the steps h and e to the step i, so that the inside-air circulation is maintained. After that, when the degree of the heater air supply due to the angle of the air blend door is increased in accordance with the fall of inside-air temperature, the determination in the step e changes to N (no), and accordingly, the outside-air introduction is carried out by the outside-air instruction produced in the step f.

After that, when the temperature Tw of the coolant water reaches 60° C., the determination in the step d changes to Y (yes) and the computation flow proceeds through the step e to the step f, so that the outside-air introduction is carried out. Then, the air conditioning with the outside-air introduction is maintained, except for the limited case where the determination of the step e becomes Y (yes) to produce the inside-air instruction in the step i.

[Process 6]

When the inside-air circulation command switch 22 is switched on by a person in the passenger compartment, the determination in the step a becomes Y (yes) so that the computation flow proceeds directly to the step i to produce the inside-air instruction. Accordingly, the door 6 is caused to occupy the position illustrated by a solid line in FIG. 1A, so that the air conditioning with the inside-air circulation is carried out.

In the above described steps a, d, e, g and h, in the Processes 1 through 6, the determinations are carried out by the hysteretic characteristic.

With regard to the apparatus of FIGS. 1A and 1B, it is possible to use a microcomputer as the computer circuit 7. In this regard microcomputer of 8048 type, manufactured by INTEL CORP., may be used.

Also, with regard to the apparatus of FIGS. 1A and 1B, it is possible to locate one fan at the inlet 5 for introducing outside-air and locate another fan at a portion 35 of the duct 3 for circulating inside-air, in place of the switch door 6. In such a case, switching between the outside-air introduction and the inside-air circulation can be carried out by switching selectively between these two fans.

It is possible to change the position of the switch door 6 by manual operation by a person in the passenger compartment in accordance with indications of the indicator 62, which indicates the door control signal, instead of by the automatic control by the door actuator 61 described hereinbefore.

It is also possible to determine the state of air heating by discriminating whether a compressor in the evaporator is in operation or stopped, instead of by the detection by the heater air supply sensor 332 described hereinbefore.

We claim:

1. An apparatus for air conditioning vehicles by controlling the circulation of inside-air and introduction of outside-air in which an inlet for inside-air and an inlet for outside-air are selectively opened and closed, and the circulation of inside-air and the introduction of outside-air are selectively effected, comprising:

duct means for passing air to a passenger compartment,
   a cooling means provided in said duct means for cooling the air,
   a heater means provided in said duct means for heating the air,
   a sensor for sensing the temperature of a coolant which circulates through the engine of said vehicle;
   a detector for detecting a degree of the heater air supply, said heater means being used for heating the air supplied to the passenger compartment of said vehicle; and
   control means for effecting switching between the inside-air circulation and the outside-air introduction in accordance with the sensed temperature of the coolant and the detected degree of the heater air supply,
   said control means comprising a switching means for switching the inside-air circulation and the outside-air introduction and a computer means for (a) receiving the signals from said sensor and said detector and (b) controlling the operation of said switching means;
   said computer means for (a) determining whether or not the coolant temperature is lower than a predetermined temperature in accordance with the signal from said sensor, (b) determining whether or not the air-conditioning is in a heating manner in accordance with the signal from said detector, and (c) accordingly actuating said switching means so that the inside-air circulation state is maintained in the case where the result of the above determinations indicate that the coolant temperature is lower than the predetermined temperature and at least some air is being heated by said heater means.

2. An apparatus for air conditioning vehicles by controlling the circulation of inside-air and introduction of outside-air in which an inlet for inside-air and an inlet for outside-air are selectively opened and closed, and the circulation of inside-air and the introduction of outside-air are selectively effected, said apparatus comprising:

a duct connected to a passenger compartment of said vehicle,
   a switch door for controlling whether outside air is brought into the duct,
   a blower for moving air through the duct,
   an evaporator for cooling air flowing in the duct,
   a heater for heating a portion of the air flowing in the duct,
   an air blend door having a controllable angle for controlling the portion of air flowing in the duct that is heated by the heater,
   a door actuator for controlling the position of said switch door,
   a heater air supply controller for controlling the angle of said air blend door,
   a passenger compartment temperature sensor,
   an atmospheric temperature sensor, and
   a computer circuit means for producing control signals for said door actuator and said heater air supply controller in accordance with the signals from said sensors, a coolant temperature sensor for sensing the temperature of the coolant water of the engine of said vehicle which is supplied to said heater, a detector for detecting the degree of the heater air supply determined by the angle of said air blend door, the signals produced in said water temperature sensor and said heater air supply detector being supplied to said computer circuit;

said computer circuit means being for (a) determining whether or not coolant temperature is lower than a predetermined temperature in accordance with the signal from said sensor, (b) determining whether or not the air-conditioning is in a heating manner in accordance with the signal from said detector, and (c) accordingly actuating said switch door so that the inside-air circulation state is maintained in the case where the results of the above achieved determinations indicate that the coolant temperature is lower than the predetermined temperature and the air-conditioning is in a heating manner.

3. An apparatus as defined in claim 1 or 2 wherein said detection of the degree of the heater air supply is effected by the measurement of the angle of the air blend door in front of said heater.

4. An apparatus as defined in claim 1 or 2, wherein said switching between the inside-air circulation and the outside-air introduction is effected by the operation of a door actuator.

5. An apparatus as defined in claim 1 or 2 wherein said computer circuit means receives signals from a starter switch, an inside-air circulation command switch, a manual temperature command device, a passenger compartment temperature sensor, and an outside-air temperature sensor.

6. In a vehicle having a coolant-cooled engine and an air-conditioned passenger compartment including a duct for conducting air into the passenger compartment, means for conducting air into the passenger compartment, means for controlling whether the air conducted through the duct is recirculated air from the passenger compartment or outside air, means for cooling air flowing in the duct, means for heating air flowing in the duct, and means for controlling an amount of air that is heated by the heating means, a method for air-conditioning the passenger compartment comprising the steps of:

(a) determining whether the coolant temperature is greater than a first predetermined temperature;

(b) in the event that the coolant temperature is determined at step (a) to be greater than the first predetermined temperature, determining whether the system is operating in a maximum cooling mode in which none of the air flowing in the duct is heated;

(c) in the event that the system is determined at step (b) to not be operating in the maximum cooling mode, producing an outside air instruction causing outside air to flow into the passenger compartment;

(d) if the determination at step (b) is that the system is operating in the maximum cooling mode, producing an inside air instruction causing air to circulate within the passenger compartment without the introduction of outside air therein;

(e) in the event that the coolant temperature is determined at step (a) to not be greater than said first predetermined temperature, determining whether the coolant temperature is greater than a second predetermined temperature that is less than the first predetermined temperature; and (f) in the event that the coolant temperature is determined at step (e) to not be greater than the second predetermined temperature, producing an inside air instruction causing air to circulate within the passenger compartment without the introduction therein of outside air.

7. A method according to claim 6 further including the steps of:

(g) in the event that the coolant temperature is determined at step (e) to be greater than the second predetermined temperature, determining whether more than a predetermined amount of heated air is being supplied to the passenger compartment;

(h) in the event that the determination at step (g) indicates that more than the predetermined amount of heated air is being supplied to the passenger compartment, producing an inside air instruction causing air to circulate within the passenger compartment without the introduction therein of outside air.

8. A method according to claim 7 further including the steps of:

(i) in the event that the determination at step (g) is that less than the predetermined amount of heated air is being supplied to the passenger compartment, determining whether the system is operating in the maximum cooling mode;

(j) if the determination at step (i) is that the system is operating in the maximum cooling mode, providing an inside air instruction causing air to circulate within the passenger compartment without the introduction therein of outside air;

(k) if the determination of step (i) is that the system is not operating in the maximum cooling mode, providing an outside air instruction causing outside air to flow into the passenger compartment.

9. An apparatus for air-conditioning the passenger compartment of a vehicle, comprising:

an engine for driving the vehicle;

coolant for cooling the engine;

a duct for conducting air into the passenger compartment;

recirculate/outside air flow means for controlling whether the air flowing through the duct is recirculated air from the passenger compartment or outside air;

means for cooling air flowing in the duct;

means for heating air flowing in the duct;

air blend means for controlling the proportion of the air flowing in the duct that is heated by the heating means;

a sensor for sensing the temperature of the coolant;

means for detecting the proportion of air flowing in the duct as controlled by the air blend means;

control means, responsive in a predetermined manner to the coolant temperature sensor and the proportion air flow detector, for actuating the recirculated/outside air flow means, by (a) determining whether the coolant temperature as sensed by the sensor is greater than a first predetermined temperature;

(b) in the event that the coolant temperature is determined at (a) to be greater than the first predetermined temperature, determining whether the system is operating in a maximum cooling mode in which the air blend means is causing none of the air flowing in the duct to be heated;

(c) in the event that the system is determined at (b) to not be operating in the maximum cooling mode, producing an outside air instruction causing the recirculate/outside air flow means to bring outside air into the duct.

10. An apparatus according to claim 9 wherein the control means further comprises means for (d) if the determination at (b) is that the system is operating in the maximum cooling mode, producing an inside air instruction causing the recirculate/outside air flow means to bring recirculated air into the duct.

11. An apparatus according to claim 9 wherein the control means further comprises means for (e) in the event that the coolant temperature is determined at (a) to not be greater than said first predetermined temperature, determining whether the coolant temperature as sensed by the sensor is greater than a second predetermined temperature that is less than the first predetermined temperature;

(f) in the event that the coolant temperature is determined at (e) to not be greater than the second predetermined temperature, producing an inside air instruction causing the recirculate/outside air flow means to bring recirculated air into the duct.

12. An apparatus according to claim 11 wherein the control means further comprises means for (g) in the event that the coolant temperature is determined at (e) to be greater than the second predetermined temperature, determining whether the proportion of duct air being heated, as sensed by the detecting means, is greater than a predetermined proportion;

(h) in the event that the determination at (g) indicates that more than the predetermined proportion of duct air is being heated, producing an inside air instruction causing the recirculate/outside air flow means to bring recirculated air into the duct.

13. An apparatus according to claim 12 wherein the control means further comprises means for (i) in the event that the determination at (g) is that less than the predetermined proportion of duct air is being heated, determining whether the system is operating in the maximum cooling mode;

(j) if the determination at (i) is that the system is operating in the maximum cooling mode, providing an inside air instruction causing the recirculate/outside air flow means to bring recirculated air into the duct;

(k) if the determination at (i) is that the system is not operating in the maximum cooling mode, providing an outside air instruction causing the recirculate/outside air flow means to bring outside air into the duct.

14. In a vehicle having a coolant-cooled engine and an air-conditioned passenger compartment including a duct for conducting air into the passenger compartment, means for controlling whether the air conducted through the duct is recirculated air from the passenger compartment or outside air, means for cooling air flowing in the duct, means for heating air flowing in the duct, means for controlling an amount of air that is heated by the heating means, a method for air-conditioning the passenger compartment comprising the steps of:

(a) determining whether the coolant temperature is greater than a predetermined temperature;

(b) in the event that the coolant temperature is determined at step (a) to be greater than the predetermined temperature, determining whether more than a predetermined amount of heated air is being supplied to the passenger compartment; and (c) in the event that the determination at step (b) indicates that more than said predetermined amount of heated air is being supplied to the passenger compartment, producing an inside air instruction causing air to circulate within the passenger compartment without the introduction therein of outside air.

15. A method according to claim 14 further including the step of:

(d) in the event that determination at step (b) indicates that less than said predetermined amount of heated air is being supplied to the passenger compartment determining whether the system is operating in a maximum cooling mode in which none of the air flowing in the duct is heated;

(e) in the event that the system is determined at step (d) to not be operating in the maximum cooling mode producing an outside air instruction causing outside air to flow into the passenger compartment; and (f) in the event that the system is determined at step (d) to be operating in the maximum cooling mode, producing an inside air instruction causing air to circulate within the passenger compartment without the introduction of outside air therein.

16. An apparatus for air-conditioning the passenger compartment of a vehicle, comprising:

an engine for driving the vehicle;
coolant for cooling the engine;
a duct for conducting air into the passenger compartment;
recirculate/outside air flow means for controllino whether the air flowing through the duct is recirculated air from the passenger compartment or outside air;
means for cooling air flowing in the duct;
means for heating air flowing in the duct;
air blend means for controlling the proportion of the air flowing in the duct that is heated by the heating means;
a sensor for sensing the temperature of the coolant;
means for detecting the proportion of air flowing in the duct as controlled by the air blend means;
control means, responsive in a predetermined manner to the coolant temperature sensor and the proportion air flow detector, for actuating the recirculated/outside air flow means, by (a) determining whether the coolant temperature is greater than a predetermined temperature;

(b) in the event that the coolant temperature is determined at (a) to be greater than the predetermined temperature, determining whether more than a predetermined amount of heated air is being supplied to the passenger compartment; and (c) in the event that the determination at (b) indicates that more than said predetermined amount of heated air is being supplied to the passenger compartment, producing an inside air instruction causing air to circulate within the passenger compartment without the introduction therein of outside air.

17. An apparatus according to claim 16 wherein the control means further comprises means for
   (d) in the event the determination at (b) indicates that less than said predetermined amount of heated air is being supplied to the passenger compartment determining whether the system is operating in a maximum cooling mode in which none of the air flowing in the duct is heated;
   (e) in the event that the system is determined at (d) to not be operating in the maximum cooling mode producing an outside air instruction causing outside air to flow into the passenger compartment; and
   (f) in the event that the system is determined at (d) to be operating in the maximum cooling mode, producing an inside air instruction causing air to circulate within the passenger compartment without the introduction of outside air therein.

* * * * *